(12) United States Patent
Andon et al.

(10) Patent No.: US 12,342,899 B2
(45) Date of Patent: *Jul. 1, 2025

(54) FOOTWEAR WITH MECHANICAL FOOT-INSERTION ASSIST

(71) Applicant: NIKE, Inc., Beaverton, OR (US)

(72) Inventors: Christopher Andon, Portland, OR (US); Timothy P. Hopkins, Lake Oswego, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/372,228

(22) Filed: Sep. 25, 2023

(65) Prior Publication Data
US 2024/0008592 A1    Jan. 11, 2024

Related U.S. Application Data

(63) Continuation of application No. 16/907,507, filed on Jun. 22, 2020, now Pat. No. 11,766,090, which is a continuation of application No. 15/795,397, filed on Oct. 27, 2017, now abandoned.

(60) Provisional application No. 62/413,600, filed on Oct. 27, 2016.

(51) Int. Cl.
| | |
|---|---|
| *A43B 11/00* | (2006.01) |
| *A43B 3/34* | (2022.01) |
| *A43B 3/38* | (2022.01) |
| *A43B 13/14* | (2006.01) |
| *A43B 13/38* | (2006.01) |
| *A43B 23/02* | (2006.01) |
| *B65G 15/30* | (2006.01) |

(52) U.S. Cl.
CPC ............... *A43B 11/00* (2013.01); *A43B 3/34* (2022.01); *A43B 3/38* (2022.01); *A43B 13/14* (2013.01); *A43B 13/38* (2013.01); *A43B 23/0245* (2013.01); *B65G 15/30* (2013.01)

(58) Field of Classification Search
CPC ..... A43B 11/00; A43B 13/14; A43B 3/00005; A43B 3/0015; A43B 23/0245; A43B 13/38; B65G 15/30
See application file for complete search history.

(56) References Cited

U.S. PATENT DOCUMENTS

| | | |
|---|---|---|
| 4,922,634 A | 5/1990 | Seidel |
| 6,032,387 A | 3/2000 | Johnson |
| 8,935,860 B2 | 1/2015 | Torres |
| 9,241,539 B1 | 1/2016 | Keswin |
| 9,254,018 B2 | 2/2016 | Bliss |
| 9,609,904 B2 | 4/2017 | Zwick et al. |

(Continued)

OTHER PUBLICATIONS

"U.S. Appl. No. 15/795,397, Non Final Office Action mailed Jan. 22, 2020", 8 pgs.

(Continued)

*Primary Examiner* — Katharine G Kane
(74) *Attorney, Agent, or Firm* — Schwegman, Lundberg & Woessner, P.A.

(57) ABSTRACT

An article of footwear and methods include an insole, an upper configured to form a space between the upper and the insole configured to admit and secure a foot of a wearer, and a rotatable conveyor element. The rotatable conveyor element is seated in at least one of the insole and the upper. The rotatable conveyor element is configured to rotatably engage a body part of the wearer as the foot enters the space and draw the foot into the space.

10 Claims, 5 Drawing Sheets

(56) References Cited

U.S. PATENT DOCUMENTS

| | | |
|---|---|---|
| 9,925,453 B1 | 3/2018 | Tuli |
| 10,102,722 B2 | 10/2018 | Levesque et al. |
| 10,405,609 B2 | 9/2019 | Orand |
| 11,766,090 B2 | 9/2023 | Andon et al. |
| 2005/0082099 A1 | 4/2005 | Tuli |
| 2006/0053659 A1 | 3/2006 | Johnson |
| 2007/0164521 A1 | 7/2007 | Robinson |
| 2008/0301919 A1 | 12/2008 | Ussher |
| 2009/0272007 A1 | 11/2009 | Beers et al. |
| 2009/0272013 A1 | 11/2009 | Beers et al. |
| 2012/0150086 A1 | 6/2012 | Cohen |
| 2013/0104429 A1 | 5/2013 | Torres |
| 2014/0338225 A1 | 11/2014 | Bliss |
| 2016/0143396 A1 | 5/2016 | Beers |
| 2017/0055626 A1 | 3/2017 | Rushbrook |
| 2017/0265576 A1 | 9/2017 | Beers et al. |
| 2017/0265585 A1 | 9/2017 | Orand |
| 2018/0116334 A1 | 5/2018 | Andon et al. |
| 2018/0125168 A1 | 5/2018 | Beers et al. |
| 2020/0315289 A1 | 10/2020 | Andon et al. |

OTHER PUBLICATIONS

"U.S. Appl. No. 15/795,397, Response filed Dec. 30, 2019 to Restriction Requirement mailed Oct. 30, 2019", 7 pgs.

"U.S. Appl. No. 15/795,397, Restriction Requirement mailed Oct. 30, 2019", 6 pgs.

"U.S. Appl. No. 16/907,507, Final Office Action mailed Jan. 23, 2023", 8 pgs.

"U.S. Appl. No. 16/907,507, Non Final Office Action mailed Mar. 14, 2022", 8 pgs.

"U.S. Appl. No. 16/907,507, Notice of Allowance mailed May 22, 2023", 5 pgs.

"U.S. Appl. No. 16/907,507, Response filed Feb. 28, 2022 to Restriction Requirement mailed Aug. 30, 2021", 5 pgs.

"U.S. Appl. No. 16/907,507, Response filed Apr. 24, 2023 to Final Office Action mailed Jan. 23, 2023", 6 pgs.

"U.S. Appl. No. 16/907,507, Response filed Sep. 14, 2022 to Non Final Office Action mailed Mar. 14, 2022", 6 pgs.

"U.S. Appl. No. 16/907,507, Restriction Requirement mailed Aug. 30, 21", 9 pgs.

"U.S. Appl. No. 15/795,397 Preliminary Amendment Flled Nov. 9, 2017", 6 pgs.

FOOTWEAR WITH MECHANICAL FOOT-INSERTION ASSIST

PRIORITY

This application is a continuation application of U.S. patent application Ser. No. 16/907,507, filed Jun. 22, 2020, which application is a continuation of U.S. patent application Ser. No. 15/795,397, filed Oct. 27, 2017, which application claims the benefit of priority to U.S. Provisional Application No. 62/413,600, "FOOTWEAR WITH FOOT-ENTRY-CONVEYOR ASSIST", filed Oct. 27, 2016, the contents of all which are incorporated by reference herein in their entireties.

TECHNICAL FIELD

The subject matter disclosed herein generally relates to an footwear with a mechanism for foot-insertion assistance.

BACKGROUND

Articles of footwear that enclose a foot, such as shoes, boots, and close-toed sandals, conventionally utilize a sole and a textile and/or leather "upper" to define a space into which the foot may be inserted and secured. A collar and throat of the upper provides a point of entry to the space. A wearer positions the footwear such that the foot can pass through the collar and throat and applies enough relative force between the foot and the footwear that the foot overcomes the friction with the footwear that the foot passes through the collar and into and substantially into the space.

BRIEF DESCRIPTION OF THE DRAWINGS

Some embodiments are illustrated by way of example and not limitation in the figures of the accompanying drawings.

DETAILED DESCRIPTION

Example methods and systems are directed to an footwear with a mechanism for foot-insertion assistance. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In general, overcoming the friction between the foot and footwear (herein after simply "footwear") may conventionally involve techniques including gripping the footwear with the hands and one or both of pulling the footwear over the shoe and pushing the foot into the footwear. Additionally, the footwear may be secured against a wall, floor, or other apparatus and the foot pushed into the footwear. Devices, such as shoehorns and the like, have been developed for temporary insertion into the footwear to reduce the friction needed to overcome to insert the foot. However, in such cases, the footwear itself may tend to passively oppose the insertion of the foot.

Footwear has been developed that includes one or more integrated rotatable conveyor elements to assist the insertion of the foot into the footwear and/or to actively draw the foot into the footwear. In various examples, a the rotatable conveyor elements are one or more of a conveyor belt integrated into the sole and/or the upper functions to draw the foot into the space. The conveyor belt may be unpowered and passively reduce the friction between the footwear and the foot or may be powered to actively draw the foot into the space. In further examples, the rotatable conveyor element may be an integrated collar mechanism in the collar and/or throat of the footwear further configured to engage with the foot, ankle, and/or leg to assist or draw the foot into the footwear and, in certain examples, secure the footwear around and to the ankle and/or leg.

Figure 1A:
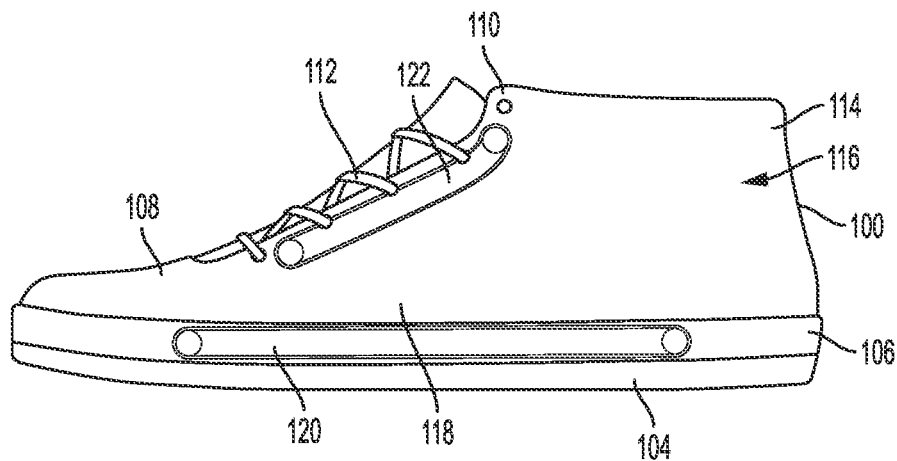
FIGS. 1A and 1B are a cutaway depiction of footwear and a block circuit diagram of electronic components of the footwear, in an example embodiment.
Figure 1B:
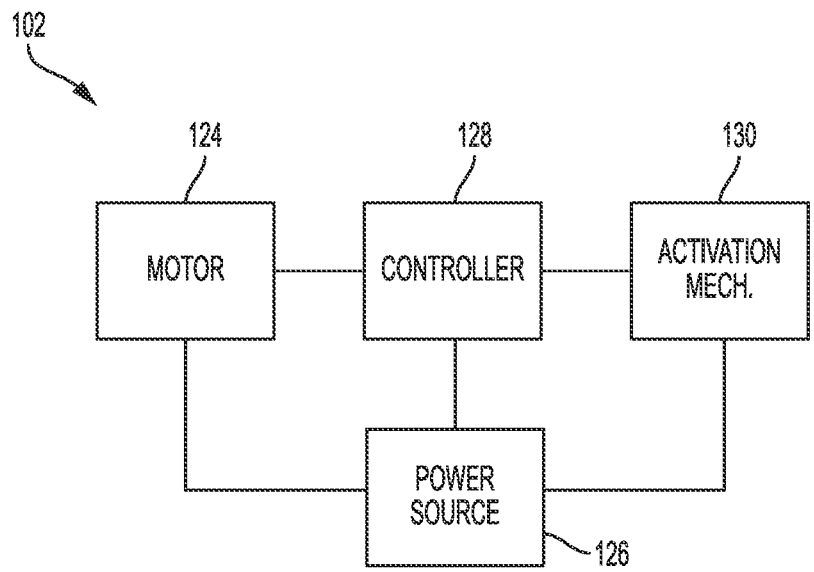

FIGS. 1A and 1B are a cutaway depiction of footwear 100 and a block circuit diagram 102 of electronic components of the footwear 100, in an example embodiment. The footwear 100 includes an outsole 104 designed to come into contact with a surface, such as the ground or a floor, an insole 106 configured to seat a human foot, an upper section ("upper") 108 configured to enclose the human foot, and a tongue 110 configured to facilitate securing the footwear 100 to the human foot via laces 112. A collar 114 of the upper 108 defines a throat section 116 into and through which a foot is inserted to gain access to a space 118 in which the foot is seated. It is to be recognized that this is a simplified depiction of conventional footwear 100 and that the footwear 100 may incorporate any of a variety of components or features. Further, the footwear 100 may not incorporate all of these features or may include these features in other formats (e.g., a sandal may incorporate the outsole 104 and a reconfigured upper section 106 and no insole 106, tongue 110, and laces 112). It is contemplated that the principles disclosed herein will be applicable and adaptable to any of a range of footwear 100.

The footwear 100 further includes an insole conveyor belt 120 integrated into the insole 106. The footwear 100 further optionally includes an upper conveyor belt 122 integrated into the upper 108. Alternatively, the footwear 100 does not include the insole conveyor belt 120 but does include the upper conveyor belt 122. While the insole conveyor belt 120 and upper conveyor belts 122 are described as conveyor belts in particular, it is to be understood that any suitable mechanism for longitudinally conveying the foot along the insole 106. As such, mechanisms such as a clamp that runs along a track integrated into the insole 106 or other related mechanisms may also be utilized instead of in addition to the conveyor belt 120 or may be applied in addition to or instead of the conveyor belt 122.

In an example, the insole conveyor belt 120 is coupled to a motor 124 which is coupled to a power source 126, such as a battery, capacitor, supercapacitor, or other suitable energy storage device. The power source 126 may be replaceable and/or rechargeable. In examples where the power source 126 is rechargeable, the power source 126 may include or may be coupled to a kinetic energy generator, such as a piezoelectric generator or other suitable power generation mechanism. A controller 128 is coupled to the motor 124 and power source 126 and is configured to cause the motor 124 to deliver power to one or more components of the insole conveyor belt 120 to cause the insole conveyor belt 120 to turn to draw the foot into the footwear 100. It is noted that the motor 124 may include one or more individual motors coupled tot eh power source 126 and controller 128 to deliver motive power to discrete components of the insole conveyor belt 120.

In various examples, the controller 128 is coupled to an activation mechanism 130, such as a switch or mechanism to detect the presence of the foot or other body party of the user. The switch may be located so that the foot triggers the switch when the foot enters the footwear 100 or the switch may be accessible so that the wearer may intentionally trigger the switch. The switch may be any of a variety of mechanisms, including but not limited to a pressure sensor, a magnet may be positioned in relation to a magnetometer such that the entry of the foot into the footwear 100 causes a sensed magnetic field by the magnetometer to change, a sensor may sense a change in capacitance that may be induced by the presence of the foot, and so forth. Additionally or alternatively, the activation mechanism 130 may be or may include an accelerometer, a gyroscope, or other sensor configured to detect a change in the physical orientation or movement of the footwear 100.

Upon the activation mechanism 130 being triggered, the controller 128 may cause the motor 124 to drive the insole conveyor belt 120 to draw the foot into the space 118. A further triggering of the activation mechanism 130 may cause the controller to induce the motor to drive in the opposite direction to help move the foot out of the space 118. In various examples, the activation mechanism 130 may utilize the switch to draw the foot into the space 118 and may utilize the sensor to detect a change in orientation or movement of the footwear, e.g., by implementing a predetermined movement with the footwear 100, such as clicking the heels, to push the foot out of the space 118.

Figure 2A:
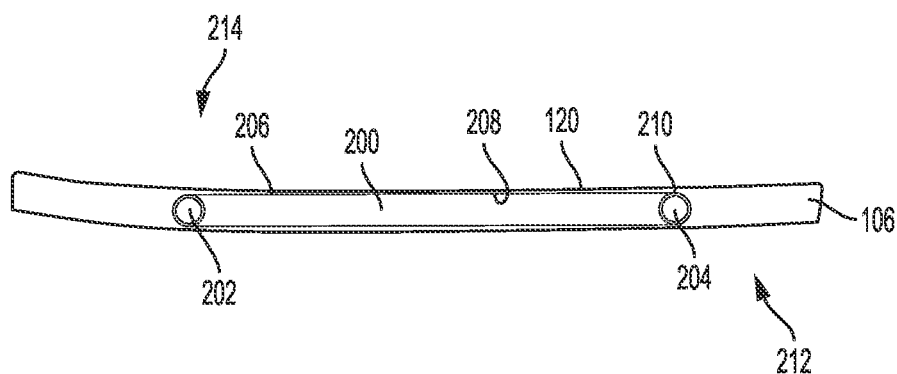
FIGS. 2A and 2B are side and top-down views of the insole conveyor belt with respect to the insole, in an example embodiment.
Figure 2B:
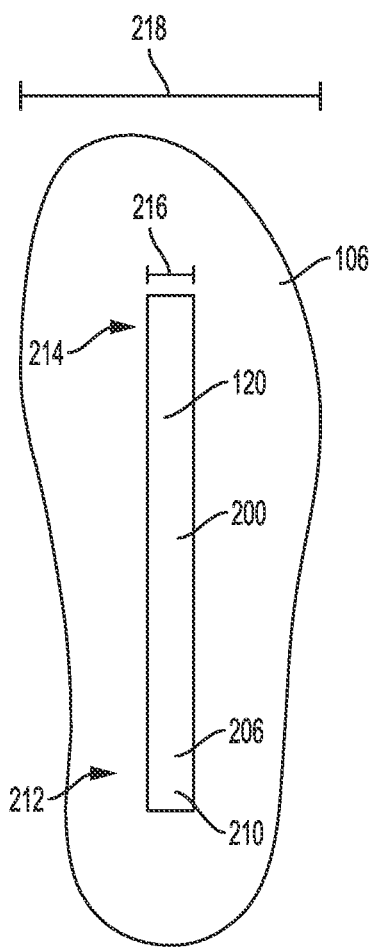

FIGS. 2A and 2B are side and top-down views of the insole conveyor belt 120 with respect to the insole 106, in an example embodiment. The insole conveyor belt 120 includes a belt 200 secured between at least two wheels 202, 204. In various examples, one or both of the wheels 202, 204 are coupled to and driven by the motor 124. In various examples, the belt 200 may have a relatively sticky or abrasive external surface 206 to promote contact with the toes and/or bottom surface the foot or a sock worn by the foot. In various examples, the belt 200 may have a relatively smooth inner surface 208 to promote low friction in circumstances where the inner surface 208 comes into contact with itself between the wheels 202, 204 owing to slack in the belt 200 or force imparted by the foot. In examples where the inner surface 208 is smooth, one or both of the wheels 202, 204 may include teeth, nubs, or other mechanisms to promote engagement with the inner surface 208 even when the inner surface 208 promotes relatively low friction. In various examples, the belt 200 is made from latex, another suitable polymer, or any suitable material.

In the illustrated example, the insole conveyor belt 120 extends from approximately the middle 210 of the heel region 212 to an area 214 consistent with the ball of the foot, though different lengths of the insole conveyor belt 120 are contemplated. As such, the insole conveyor belt 210 may tend to maintain contact with at least a portion of the foot that tends to have relatively high pressure on the insole 106 during a normal insertion of the foot into the footwear 100. The belt 200 has a width 216 approximately one third that of a maximum width 218 of the insole 106, though alternative width ratios are contemplated.

The principles described with respect to the insole conveyor belt 120 apply as well to the upper conveyor belt 122. Rather than being configured to engage with the toes or bottom of the foot, though, the upper conveyor belt 122 may engage with an upper surface of the foot or sock. As noted herein, the wheels 202, 204 may in certain examples of the upper conveyor belt 122 not be connected to a motor 124 and instead may function to provide for reduced friction on the top of the foot rather than providing motive force to actively draw the foot in to the space 118.

Figure 3A:
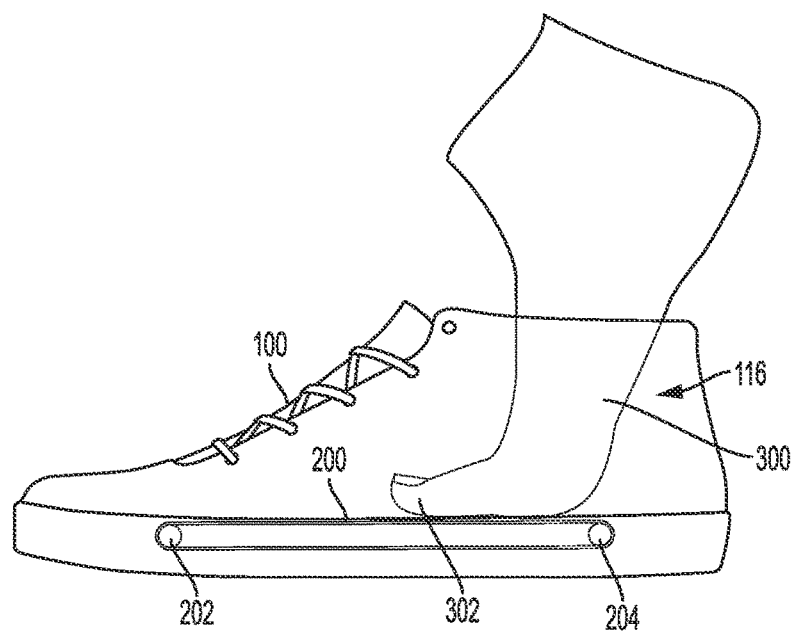
FIGS. 3A-3C illustrate the insole conveyor belt being utilized to draw a foot into the space within the footwear, in an example embodiment.
Figure 3B:
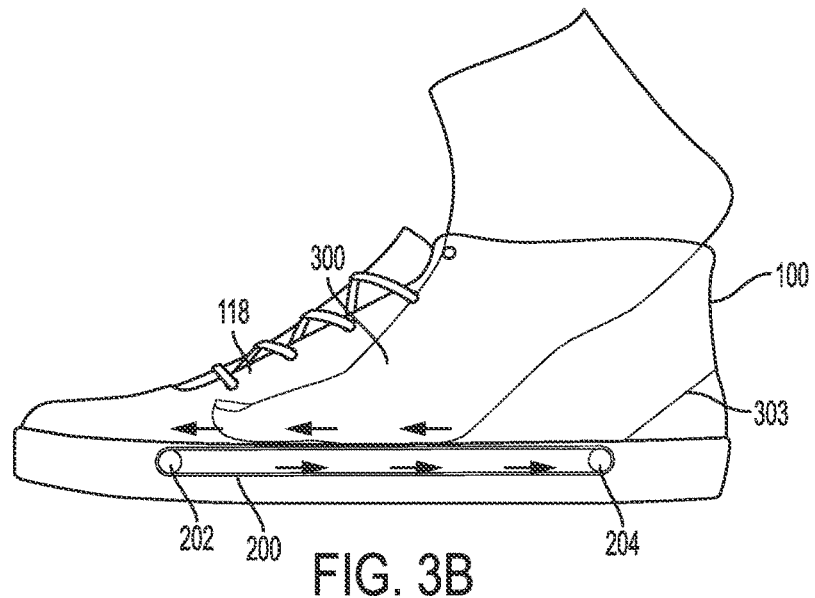
Figure 3C:
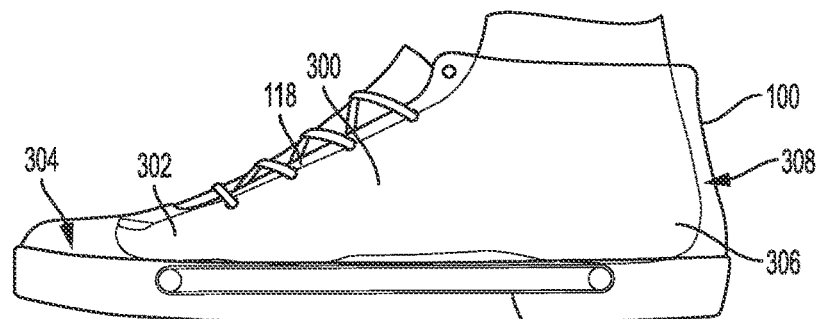

FIGS. 3A-3C illustrate the insole conveyor belt 120 being utilized to draw a foot 300 into the space 118 within the footwear 100, in an example embodiment. For simplicity, the upper conveyor belt 122 is omitted but it is to be understood that various examples may include the upper conveyor belt 122.

In FIG. 3A the foot 300 is inserted through the throat section 116 of the footwear 100 until the toes 302 are in contact with the insole conveyor belt 120. At some point during the insertion of the foot 300 through the throat section 116 and contact with the belt 200 the activation mechanism 130 is triggered by pressure from or otherwise by the presence of the foot 300 in the footwear 100. Alternatively, the wearer of the footwear 100 manually triggers a switch of the activation mechanism 130.

In FIG. 3B, the controller 128 causes the motor 124 to deliver power to one or both of the wheels 202, 204 which turn, causing the belt 200 to impart force on the foot 300 to draw the foot into the space 118. In various examples, the footwear 100 may optionally incorporate additional mechanisms to aid in the insertion and removal of the foot 300. In an example, the insole 106 and/or the upper 108 are equipped with a lever or ramp 303 configured to deploy behind the wheel 204 and sloping upward toward the heel 308 of the footwear 100. In such an example, the ramp 303 may be coupled to the motor 124 and other electronic components and deployed at the same time the insole conveyor belt 120 begins to rotate. Alternatively, the ramp 303 may be spring loaded or otherwise mechanically deployed, e.g., by the foot 300 touching a mechanical switch coupled to a spring mechanism or other deployment mechanism. The ramp 303 may provide for relative ease of insertion or removal of the foot by reducing the angles the foot 300 may tend to encounter during insertion and removal, e.g., by not running directly into the insole 106 or heel of the footwear 100.

In various examples, the controller 128 provides an acceleration and deceleration profile for the insole conveyor belt 120. While the controller 128 may control the movement on a binary on/off basis, in certain examples the starting and stopping of turning the wheels 202, 204 may have a deliberate acceleration and deceleration profile to lessen a likelihood of sudden starts and stops which may provide discomfort to the wearer. Thus, in an example in which the motor 124 turns the wheels 202, 204 for two seconds during insertion and/or removal of the foot 300, the motor 124 may accelerate the wheels 202, 204 for three-quarters of a second, hold a constant speed for one-half of a second, and decelerate for three-quarters of a second, among any of a variety of potential acceleration and deceleration profiles.

In FIG. 3C, the controller 128 causes the motor 124 to cease to deliver power, causing the belt 200 to stop turning.

In various examples, the activation mechanism 130 includes a sensor in or near a toe box 304 of the footwear 100 to detect when the toes 302 generally occupy the toe box 304, meaning that the foot 300 is generally seated within the space 118. Alternatively, the controller 128 may cause the motor 124 to cease to delivery power after a predetermined period of time sufficient to draw the foot 300 into the space 118 or the wearer may perform a predetermined action, such as one of those disclosed herein, to cause the controller 128 to cease operation of the motor 124.

Upon completion of insertion of the foot 100, the controller 128 may cause the motor 124 and/or the wheels 202, 204 to lock to prevent free movement of the belt 200. In such an example, the motor 124 may be configured to actively resist movement of the wheels 202, 204 if force is exerted on the wheels 202, 204 by way of the belt 200 during normal wear. Additionally or alternatively, a physical brake may be deployed on the wheels 202, 204 to passively prevent turning of the wheels 202, 204 unless deliberately caused by the motor 124. Any of a variety of additional brakes or mechanisms for preventing unintentional turning of the insole conveyor belt 120 are contemplated.

The sequence described herein with respect to drawing the foot 300 into the footwear 100 may be repeated in reverse to push the foot 300 out of the footwear 100. It is noted that a heel 306 of the foot 300 may advantageously be slipped form a heel region 308 of the footwear 100 prior to engaging the motor 124. Additionally or alternatively, a conveyor belt or other mechanism disclosed herein may be positioned in the heel region 308 or throat section 114 to promote the removal of the foot 300 from the footwear 100.

Figure 4A:
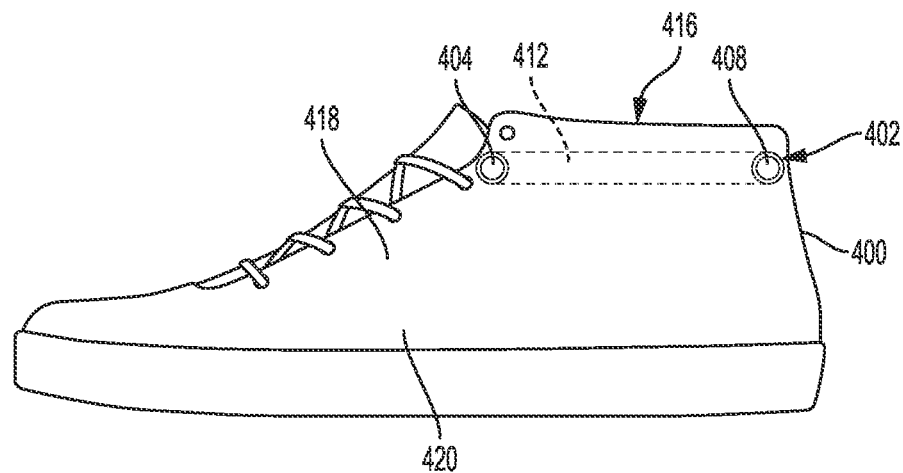
FIGS. 4A and 4B illustrate side and top cutaway views of footwear including a collar mechanism configured to draw a foot the footwear, in an example embodiment.
Figure 4B:
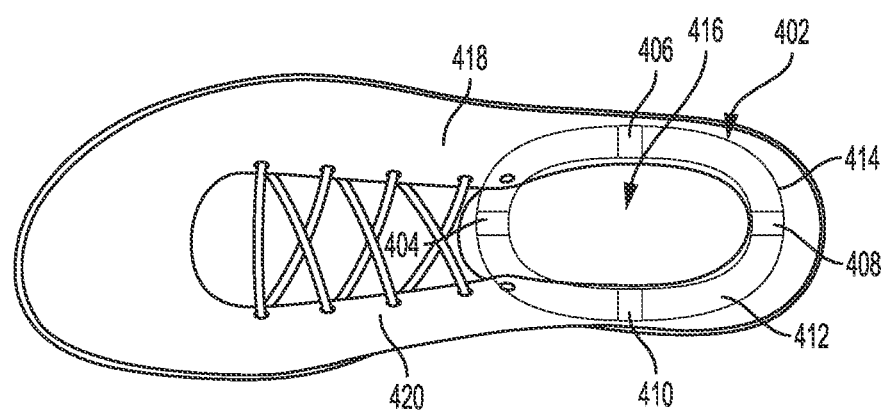

FIGS. 4A and 4B illustrate side and top cutaway views, respectively, of footwear 400 including a collar mechanism 402 configured to draw a foot 300 into the footwear 400, in an example embodiment. The footwear 400 includes some or all of the components of the footwear 100, including, in examples in which the collar mechanism 402 is an active collar mechanism, the motor 124, the power source 126, the controller 128, and the activation mechanism. Examples in which the collar mechanism 402 is passive may omit some or all of the motor 124, the power source 126, the controller 128, and the activation mechanism.

The collar mechanism 402 includes multiple wheels 404, 406, 408, 410. Various examples may include more or fewer wheels than the four illustrated. In the illustrated example, the wheels 404, 406, 408, 410 are rotatably coupled to the inside of tubing 412 of the collar mechanism 402. In various examples, the tubing 412 is flexible and is made from a polymer, a medical-grade plastic, or any other suitable material. In various examples, the tubing 412 is comprised of a single length of tubing circumferentially joined together, or is comprised of multiple discrete segments each coupled to at least one but not all of the wheels 404, 406, 408, 410. In various examples, the tubing 412 is or is coated on an exterior surface 414 with latex or other material suitable to promote a friction engagement with a foot, leg, sock, or other apparel worn by a wearer of the footwear 400.

In an alternative example, the tubing 412 is omitted and the wheels 404, 406, 408, 410 are positioned to come into contact with a foot, leg, sock, or other apparel worn by a wearer of the footwear 400. In such an example, the wheels 404, 406, 408, 410 may be coated with latex or other suitable material or my otherwise be configured to promote engagement with the wearer. As such, the wheels 404, 406, 408, 410 may be coated in or made from latex, another suitable material, or may be roughened or otherwise configured to promote engagement with the wearer. The principles described with respect to the tubing 412 may, as such, also apply to any examples in which the tubing 412 is omitted in favor of direct contact with the wheels 404, 406, 408, 410.

As the wearer inserts a foot 300 into the throat section 416 the foot 300 and/or associated sock or apparel may come into contact with the tubing 412. In examples where the collar mechanism 402 is passive, the force imparted by the wearer on the tubing 412 may cause the tubing 412 to rotate with the wheels 404, 406, 408, 410, providing for comparatively less friction than would be the case if the foot 300 was rubbing against only the upper 418. Where the collar mechanism 402 is active, the activation mechanism 130 may output a signal as described herein, based on which the controller causes the motor 124 to drive the wheels so as to draw the foot 300 into the space 420. In contrast to the insole conveyor belt 120 of footwear 100, the collar mechanism 402 may engage with first the foot 300 and then one or both of the ankle and/or leg of the wearer as the foot 300 is drawn further into the space 420. Similarly, when the wearer is ready to remove the footwear 400 the controller 124 may reverse the drive on the wheels 404, 406, 408, 410, again as disclosed herein with respect to the insole conveyor belt 120.

Figure 5A:
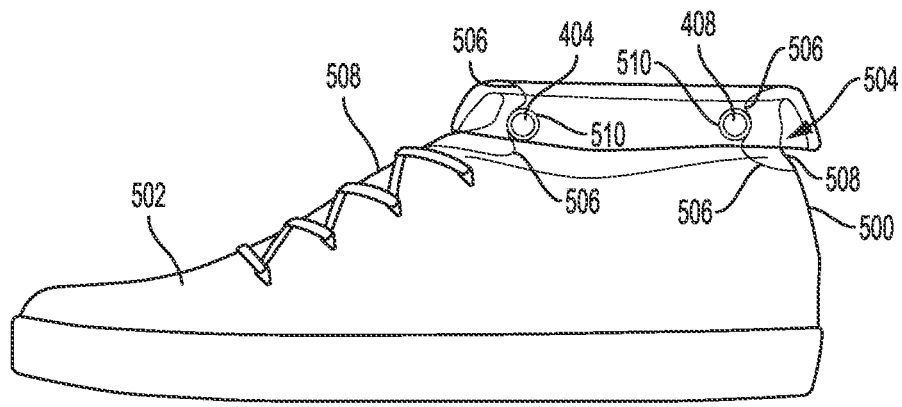
FIGS. 5A and 5B are images of footwear including an upper having an integrated sock section, in an example embodiment.
Figure 5B:
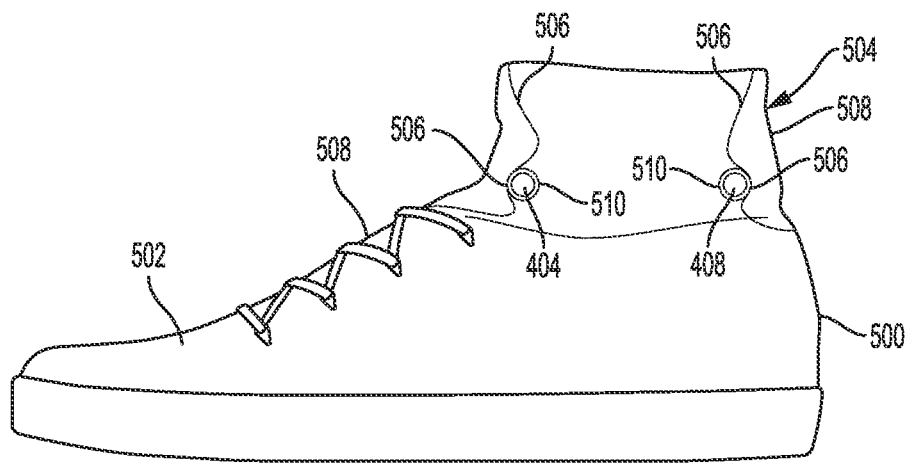

FIGS. 5A and 5B are images of footwear 500 including an upper 502 having an integrated sock section 504, in an example embodiment. The footwear 500 may be an adaptation of the footwear 400, in that the collar mechanism 402 may be included or otherwise adapted herein. In particular, the sock section 504 includes at least a semi-rigid interior portion 506 configured to engage with a posterior side 508 of the wheels 404, 408 (wheels 406, 410 may be present but are omitted from this image for clarity) relative to an anterior side 510 of the wheels which is configured to engage with the foot 300. An optional exterior portion 508 may be relatively more flexible than the interior portion 506. Alternatively, the exterior portion 508 may be semi-rigid in addition to or instead of the interior portion 506. Portions 506, 508 may be defined as semi-rigid to the extent that they are configured to receive force from the wheels 404, 408 and transfer the force to the sock section 504 generally.

As the wheels 404, 408 turn as the foot 300 is inserted into the footwear 500, the wheels 404, 408 impart a force on the interior portion 506. In FIG. 5A the sock section 502 is in a coiled state in which the interior and exterior portions 506, 508 are relatively low and coiled or bunched. The force from the wheels 404, 408 causes the portions 506, 508 to uncoil or unbunch and rise relative to the wheels 404, 408, as illustrated in FIG. 5B. As such, in an illustrative example, in the coiled state in FIG. 5A the sock section 502 may rise approximately to an ankle of a wearer while in the uncoiled state in FIG. 5B the sock section 502 may rise over the ankle and a portion of the way up the leg of the wearer.

Because the wheels 404, 408 function as part of the collar mechanism 402 generally, it is to be understood that the rising of the sock section 502 occurs as the wearer inserts their foot 300 into the footwear 500. Thus, before the wearer inserts their foot 300 the sock section 502 is coiled and low. As the foot 300 enters the footwear 500 and the wheels 404, 408 turn, either actively or passively, the force imparted from the wheels 404, 408 to the interior portion 506 causes the sock section 502 to rise and crawl up the foot 300, ankle, and/or leg during the insertion process. Similarly, during the removal process, as the wheels 404, 408 turn the opposite direction, the force on the interior portion 506 causes the sock portion 502 to lower and coil or otherwise bunch. Thus, as the foot 300 withdraws from the footwear 500 the sock portion 502 automatically lowers.

The footwear 500 may optionally include a zipper or other mechanism that may function to provide an additional opening in the collar and/or throat of the footwear 500 to ease admitting the foot 300 into the footwear 300. The zipper may be manual or may be coupled to the motor 124 for automation either separately from or in conjunction with the collar mechanism 402 and the raising and lowering of the sock section 502. Thus, in an example, as the sock section 502 rises as the wearer puts the footwear 500 on, the zipper may similarly rise from a lowered position to a raised position. As the sock section 502 lowers as the user goes to remove the footwear 500, the zipper may similarly lower. It is emphasized that while the zipper is discussed for purposes of illustration, any suitable mechanism may be utilized accordingly. Moreover, multiple zippers and/or other mechanisms may be incorporated to provide a desired look or wearing profile.

The principles disclosed herein with respect to individual footwear 100, 400, 500 may be combined in individual footwear. Thus, footwear may incorporate both the insole conveyor belt 120 and the collar mechanism 402. The footwear 400, 500 may incorporate the ramp 303 while the footwear 100, 400 may incorporate the zipper of footwear 500. The ramp 303 may be mechanically deployed while the zipper may be electromechanically operated by the motor 124. It is specifically contemplated that any particular component of each of the footwear 100, 400, 500 may be incorporated in various combinations as desired.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The invention claimed is:

1. An article of footwear, comprising:
   an insole;
   an upper configured to form a space between the upper and the insole configured to admit and secure a foot of a wearer, wherein the upper forms a sock section configured to admit the foot of the wearer; and
   a collar mechanism, positioned in the sock section, comprising:
      a first wheel;
      a second wheel; and
      a flexible tube extending around at least a portion of the sock section, the flexible tube configured to cause the sock section to extend and retract as the wheel turns, the second wheel secured within the tube.

2. The article of footwear of claim 1, wherein the sock section includes a semi-rigid interior portion to engage with the collar mechanism.

3. The article of footwear of claim 2, wherein the sock section further includes an exterior portion more flexible than the semi-rigid interior portion.

4. The article of footwear of claim 2, wherein the sock section is configured to rise over an ankle of the wearer when the sock section extends.

5. The article of footwear of claim 1, wherein the collar mechanism further comprises:
   a coating around the flexible tube configured to promote engagement with a leg of the wearer, the coating comprised of at least one of: latex or a polymer.

6. The article of footwear of claim 5, wherein the collar mechanism comprises four wheels secured within the tube.

7. The article of footwear of claim 5, further comprising a motor, operatively coupled to the collar mechanism, configured to turn the wheel when in operation.

8. The article of footwear of claim 7, further comprising a power source, operatively coupled to the motor, configured to power the motor.

9. The article of footwear of claim 8, wherein the power source is a rechargeable power source.

10. The article of footwear of claim 8, wherein the power source includes a piezoelectric generator.

* * * * *